June 4, 1968  H. REINSCH  3,386,791
MOTION PICTURE CAMERA
Filed May 24, 1965
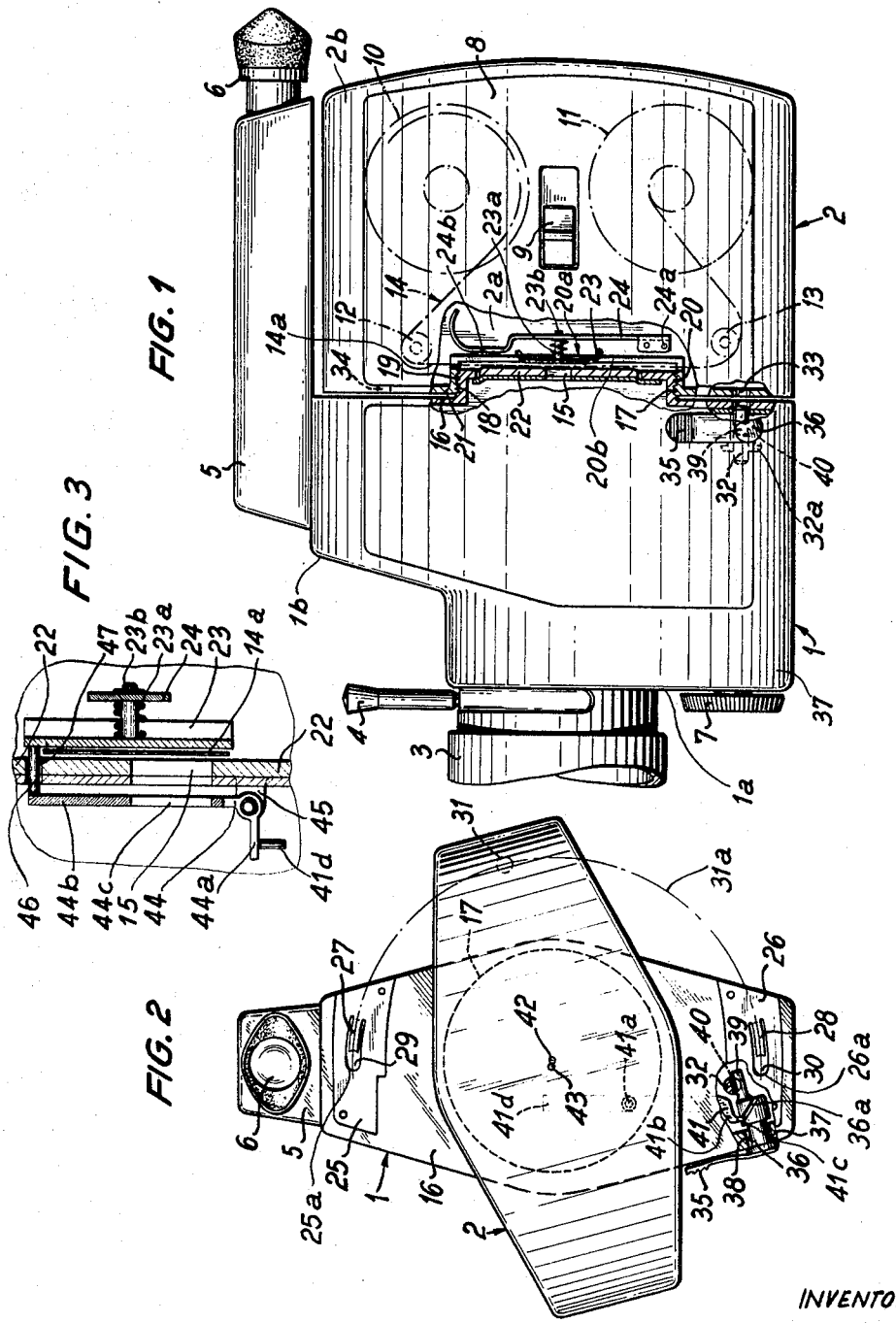
INVENTOR:
HERBERT REINSCH
BY Michael J. Striker
his ATTORNEY

United States Patent Office 3,386,791
Patented June 4, 1968

3,386,791
MOTION PICTURE CAMERA
Herbert Reinsch, Stuttgart, Germany, assignor to Eugen Bauer GmbH, Stuttgart-Unterturkheim, Germany
Filed May 24, 1965, Ser. No. 458,111
Claims priority, application Germany, Feb. 22, 1965, B 77,143
17 Claims. (Cl. 352—83)

ABSTRACT OF THE DISCLOSURE

A motion picture camera for use with double-eight film wherein the magazine is coupled to and is rotatable with reference to the housing about an axis which is parallel to the optical axis. The coupling comprises intermeshing rings provided on the rear wall of the housing and on the front wall of the magazine. The latter can be locked in two end positions and its presser plate is automatically disengaged from the film in response to unlocking.

---

The present invention relates to motion picture cameras for use with double-eight photographic film, and more particularly to improvements in motion picture cameras of the type wherein the portion containing the film chamber can be rotated through 180 degrees about an axis which is parallel with the optical axis of the lens unit.

It is already known to mount that portion of a motion picture camera which contains the film for rotation between two different angular positions. However, all versions of such motion picture camera which are known to me at this time are rather bulky, unwielding, complicated and prone to malfunction. Furthermore, the rotary portion of the camera housing exhibits a tendency to wobble, especially after repeated rotation of the film chamber.

Accordingly, it is an important object of my invention to provide a very simple, sturdy and compact coupling between the main portion and the rotary portion of a motion picture camera for use with double-eight film, and to construct the coupling in such a way that it simultaneously constitutes an effective barrier against uncontrolled entry of light into the camera housing and that such coupling controls all movements which the film containing portion is permitted to perform with reference to the remainder of the camera.

Another object of the invention is to provide a motion picture camera with reversible film chamber for use with double-eight film and to construct and assemble the camera in such a way that the portion which defines the film chamber is accurately and automatically retained in each of its end positions.

A further object of the invention is to provide a novel pressing plate construction for use in a motion picture camera of the above outlined characteristics and to provide for automatic disengagement of the pressing plate from the film when the film containing portion is ready to be moved from the one to the other of its operative positions.

A concomitant object of the invention is to provide very simple detent, arresting and locking devices which may be utilized in a motion picture camera of the above described type to releasably hold and/or to positively lock the film containing portion in each of its end positions.

Still another object of the invention is to provide a motion picture camera for use with double-eight film wherein one-half of the film is invariably located and properly held in an optimum position despite the fact that the portion which contains the film chamber is rotatable with reference to the remainder of the housing.

A concomitant object of the invention is to provide a motion picture camera wherein the viewfinder is mounted and dimensioned in such a way that its ocular can be placed close to the user's eye in each end position of the film containing portion and wherein such mounting of the viewfinder contributes little, if anything, to the bulkiness of the camera.

Another object of the invention is to provide a motion picture camera of the previously outlined type wherein the rotary film containing portion is mounted in such a way that a careless or inexperienced user is unable to detach such rotary portion from the remainder of the housing and wherein the film containing portion is automatically stopped in each of its end positions.

Briefly stated, one feature of my present invention resides in the provision of a motion picture camera for use with double-eight photographic film. The camera includes a housing comprising a rear portion which defines a film chamber and a front portion which accommodates the lens unit, and a novel coupling which connects the rear portion to the front portion. The coupling comprises an externally threaded male coupling element rigid with one of such portions and an internally threaded female coupling element rigid with the other portion and meshing with the male coupling element. The coupling elements and the respective portions of the housing are rotatable with reference to each other about a common axis which is parallel with the optical axis of the lens unit.

In accordance with another feature of my invention, the coupling elements are provided with fine-pitch or extra-fine pitch (NEF) threads so that the extent of axial movement in response to rotation of the rear portion through 180 degrees between two end positions is minimal. Suitable stop and/or detent means are provided to automatically fix the rear portion in each of its end positions, and the camera may further comprise a safety device or locking device which can be manipulated by hand to positively lock the rear portion in each of its end positions.

A further advantageous feature of my invention resides in the provision of a spring-biased pressing plate which insures that a portion of the film which is located behind the aperture plate of the camera is invariably pressed against this plate regardless of the angular position of the rear portion so as to compensate for axial movement of the rear portion during its movement from the one to the other end position or vice versa and to thereby insure that the film is invariably held in an optimum position regardless of which half of the film is located behind the exposure aperture.

The novel features which are considered as characteristic of the invention are set forth in particular in the appended claims. The improved motion picture camera itself, however, both as to its construction and the mode of manipulating the same, together with additional features and advantages thereof, will be best understood upon perusal of the following detailed description of a specific embodiment with reference to the accompanying drawings, in which:

FIG. 1 is a side elevational view of a motion picture camera which embodies my invention, a portion of the housing being broken away to reveal the details of the coupling between the front and rear portions;

FIG. 2 is a rear elevational view of the camera, as seen from the right-hand side of FIG. 1, with the rear portion shown in an intermediate position and with the rear wall of the front portion partly broken away, and FIG. 3 shows schematically details of a construction for automatically disengaging a spring biased pressing plate from the film when the rear portion of the camera is ready to be moved from the one in the other of its end positions.

Referring to the drawings, there is shown a motion picture camera for use with double-eight film, i.e., with a film one half of which is exposed while the film is being paid out by a first spool 10 and is taken up by a second spool 11 and the other half of which is exposed while the film is being fed by the spool 11 to be collected by the spool 10. The housing of the camera comprises a front portion 1 and a rear portion or magazine 2 which defines a film chamber 2a. The front wall 1a of the front portion 1 supports a lens unit 3 whose optical axis is shown at 43 and whose focal length may be adjusted by a lever 4. The speed of the motor may be selected by a knob 7 which is mounted on the front wall 1a at a level below the lens unit 3. The top wall 1b of the front portion 1 carries a viewfinder 5 having an ocular 6 extending rearwardly of the magazine 2 so that the user may place the ocular in front of his eye in each angular position of the magazine. The interior of the front portion 1 accommodates a shutter mechanism, diaphragm mechanism, a light meter and/or an exposure control of any known design. Such assemblies are not shown in FIGS. 1–3 because their construction, mounting or operation forms no part of the present invention.

One side wall 2b of the magazine 2 comprises a cover 8 which may be detached to expose the film chamber 2a. A manually reciprocable pusher 9 is provided to hold the cover 8 in the position shown in FIG. 1. The film chamber 2a accommodates the spools 10, 11 the first of which constitutes a film supply spool and the second of which constitutes the take-up spool. When the magazine 2 is rotated through an angle of 180 degrees, the spool 11 constitutes the supply spool and the spool 10 serves to take up the film 14 which is being paid out by the spool 11. The film 14 is guided in a film path defined by a guide mechanism including a pair of rollers or sprockets 12, 13 which are mounted in the magazine 2 in such a way that a portion 14a of the film extends in a vertical plane, as viewed in FIG. 1, directly adjacent to the rear side of an aperture plate or film gate 22 having an exposure aperture 15 which is located behind the lens unit 3. The film portion 14a passes through a diametral opening or slot 20b provided in a plate 20a constituting the bottom wall of an internally threaded ring-shaped female coupling element 20 which is integral with and extends rearwardly from a front wall 21 of the magazine 2. The front end of the ring 20 is open so that its internal threads 19 can mesh with external threads 18 provided on a ring-shaped male coupling element 17. The ring 17 is rigidly secured to or integral with a rear wall 16 of the front portion 1, and this wall 16 is adjacent to the wall 21. The threads 18, 19 are preferably of the fine-pitch or extra-fine pitch series (known at NEF class) to insure that rotation of the magazine 2 through an angle of 180 degrees will result in a negligible change in distance between the walls 16, 21. However, and in order to compensate for such minimal axial displacement of the magazine 2 when the user desires to reverse the position of the spools 10, 11, the film chamber 2a accommodates a suitably configurated and preferably runner-shaped pressing plate 23 which is biased by a helical expansion spring 23a and bears against the central part of the film portion 14a so that such part of the film portion 14a is invariably held flat against the rear side of the aperture plate 22. It will be seen that the width of the pressing plate 23 is less than the width of the opening or slot 20b so that the plate 23 can extend into this slot and causes the film portion 14a to bear against the aperture plate 22. The pressing plate 23 is mounted on a stud 23b which is reciprocable in a median portion of a carrier 24, here shown as a relatively strong leaf spring 24. One end of the leaf spring 24 is riveted or otherwise secured to the magazine 2, as at 24a, and its other end carries a protuberance 24b which bears against the plate 20a at one side of the slot 20b.

The motor which advances the film 14 along the rear side of the plate 22 is not shown in the drawings because its construction or operation forms no part of my invention. It suffices to say that the motor can be mounted in the front portion 1 or in the magazine 2 and operates a suitable pull-down mechanism, for example, of the type including a claw lever, which will advance the film 14 at a speed selected by the knob 7. The motor also drives the take-up spool which is in the one end position of the magazine 2 the spool 11, in the other end position the spool 10.

The common axis 42 of te rings 17 and 20 is parallel with and is located laterally of the optical axis 43, see FIG. 2. The distance between the axes 42, 43 approximates one-half the width of the film 14. The position of the exposure aperture 15 is seelcted in such a way that only one half of the film 14 is exposed when the magazine 2 is arrested and/or locked in the end position shown in FIG. 1. If the magazine 2 is thereupon rotated about the axis 42 through an angle of 180 degrees, the other half of the film 14 can be exposed while the film is being paid out by the spool 11 and is taken up by the spool 10. It will be noted that the aperture plate 22 constitutes the rear or bottom wall of the ring 17 and that this plate can extend into immediate proximity of the plate 20a which latter constitutes the bottom wall of the ring 20. As a rule, there is no need to provide special sealing rings or other sealing devices because the meshing coupling rings 17, 20 form a highly satisfactory seal around the plates 20a, 22 and fully prevent uncontrolled entry of light into the film chamber 2a and/or into the interior of the front portion 1.

It is clear that the coupling including the rings 17, 20 could be modified in such a way that the front wall 21 of the magazine 2 would carry an externally threaded coupling element and that such coupling element would mesh with a female coupling element carried by the rear wall 16. This would amount to a simple reversal of functions.

By resorting to threaded coupling elements, I provide a movie camera with a reversible film chamber wherein the total area of contact between the two coupling elements is a multiple of the area of contact between smooth-surfaced coupling elements. Therefore, the coupling including the rings 17, 20 is exceptionally sturdy and prevents any, even minimal wobbling of the magazine 2 in each of its end positions as well as during movement between such end positions. The meshing threads 18, 19 control, with utmost accuracy, not only angular but also axial movements of the magazine 2. In addition, and when it becomes necessary to separate the magazine 2 from the front portion 1, a skilled technician can effect such separation in a minute or so since all he must do is to withdraw a bolt 32 into the front portion 1, to remove a projection 31, and to thereupon simply unscrew the ring 20 by rotating the magazine in a clockwise or anticlockwise direction, depending on whether the threads 18, 19 are right-hand or left-hand threads.

FIG. 2 shows that the rear wall 16 of the front portion 1 carries two recessed plates 25, 26 which are located at the opposite sides of the rings 17, 20, i.e., the plate 25 is adjacent to the viewfinder 5 and the plate 26 is located behind the speed selector knob 7. Each of these plates carries a detent in the form of a rearwardly bent leaf spring 27, 28, and these detents cooperate with a detachable pin-shaped projection 31 which extends forwardly from the front wall 21 of the magazine 2. The distance between the projection 31 and the common axis 42 of the coupling rings 17, 20 is the same as the distance between the axis 42 and the detent 27 or 28. The phantom-line half circle 31a indicates in FIG. 2 the pathway of the projection 31 when the magazine 2 is rotated through 180 degrees to move from the first end position shown in FIG. 1 and in which the projection 31 enters a shallow recess 29 in the plate 25 to a second end position in which the projection 31 enters a similar recess 30 provided in the plate 26. The plates 25, 26 are formed with abutments 25a, 26a which are adjacent to the innermost portions of the recesses 29, 30 and which are engaged by the projection 31 in the corresponding end positions of the magazine 2. In order to move from the end position of FIG. 1 to the other end position and back to the end position of FIG. 1, the magazine 2 must be rotated about the axis 42, first in a clockwise direction (as viewed in FIG. 2) and then in a counterclockwise direction, always through an angle of exactly 180 degrees. When it begins to leave the upper end position in which it engages the abutment 25a, the projection 31 must travel over and must deform and depress the detent 27, and while approaching its other end position, the projection 31 must travel over the detent 28. These detents cooperate with the projection 31 to releasably hold the magazine 2 in the corresponding end positions so that a certain force is necessary in order to start rotation of the magazine about the axis 42.

In order to make absolutely sure that the magazine 2 can be arrested and held in each of its end positions, the camera preferably comprises a manually operated locking or blocking device which comprises a locking bolt 32 reciprocable in the rear wall 16 and in a bearing 32a provided therefor in the interior of the front portion 1. The axis of the bolt 32 is parallel with the optical axis 43, and this bolt registers with one of two recesses or bores 33, 34 provided in the front wall 21 of the magazine 2 when the magazine is moved to the corresponding end position. In the end position of the magazine 2 which is shown in FIG. 1, the bolt 32 extends into the recess 33 and thus positively prevents rotation of the magazine in a clockwise direction, as viewed in FIG. 2. If the bolt 32 is withdrawn from the recess 33 and the magazine 2 is rotated to the other end position in which the projection 31 extends into the recess 30, the bolt 32 can be shifted rearwardly to enter the recess 34.

The bolt 32 may be reciprocated by a lever 35 which is mounted on a side wall 37 and is accessible from the exterior of the front portion 1. The lever 35 is fixed to a rotary shaft 36 which is mounted in the side wall 37 of the front portion 1 and whose axis is normal or substantially normal to the axis of the bolt 32. As shown in FIG. 2, the side wall 37 has a bore 38 through which the shaft 36 extends. The inner end portion of the shaft 36 carries an eccentric stud 39 which extends into a cutout 40 fo the bolt 32 and causes the bolt to move forwardly or rearwardly, depending on the direction in which the lever 35 is rotated about the axis of the shaft 36. It is clear that the outer side of the wall 37 may be provided with inscriptions or other suitable indicia to point out which of the two end positions of the lever 35 corresponds to the locking or blocking position of the bolt 32.

The camera of FIGS. 1 and 2 is operated as follows:

When the film 14 is properly inserted in the chamber 2a and the cover 8 is returned to and locked in the sealing position, the bolt 32 and/or the pin 31 will block and/or arrest the magazine 2 in the end position of FIG. 1. The user then makes as many exposures as he wishes, utilizing different speeds if necessary, until the film 14 has been fully transferred onto the take-up spool 11. This means that one-half of the film 14 is exposed. The operator then simply turns the lever 35 in a sense to withdraw the bolt 32 from the recess 33 and exerts a small force which is necessary to move the projection 31 away from the abutment 25a (i.e., out of the recess 29) and against the bias of the spring 27. The magazine is rotated through 180 degrees so that the projection 31 enters the recess 30 and that the recess 34 registers with the bolt 32. The magazine 2 is now held in such end position solely by the spring 28. If the user wishes to lock the magazine in such end position, the lever 35 is rotated in a sense to move the bolt 32 into the recess 34. The camera is then ready for use and the operator can expose the other half of the film 14. When the film is fully exposed, the cover 8 is detached in response to manipulation of the pusher 9 and the spools 10, 11 can be replaced by a fresh pair of spools.

The user will immediately note when the projection 31 enters the recess 29 or 30 because the tip of the projection 31 will "jump" over the inner end portion of the spring 27 or 28 and also because the projection 31 will strike against the abutment 25a or 26a.

In accordance with another feature of my invention, the pressing plate 23 can be automatically withdrawn from the opening or slot 20b when the bolt 32 is retracted to idle position. The mechanism for effecting such withdrawal of the pressing plate 23 includes a small two-armed lever 41 (shown in FIG. 2) which is pivotably mounted on a shaft 41a on the rear wall 16 of the front portion 1. One arm 41b of the lever 41 carries a follower 41c tracking a cam groove 36a in the periphery of the shaft 36. The other arm 41d of the lever cooperates with an arm 44a of a bell crank 44 (FIG. 3) pivotably mounted in a bearing 45 on the aperture plate 22. The bell crank 44 has a plate-like arm 44b which is provided with an exposure aperture 44c. The arm 44b touches a pin 46 fastened on the film pressing plate 23 besides the film 14 and penetrating a slot 47 in the aperture plate 22.

When the bolt 32 is retracted to its idle position by means of the lever 35 and the stud 39, the arm 41d of the lever 41 moves the bell crank 44 to its operative position shown in FIG. 3, whereby the arm 44b of the bell crank effects withdrawal of the pressing plate 23 away from the film portion 14a. Now the magazine 2 can be moved from the one to the other of its end positions without damaging the film. As soon as the user locks the magazine 2 in the new end position the cam groove 36a of the shaft 36 turns the lever 41 in a sense to move its arm 41d out of engagement with the bell crank 44, whereupon the spring biased pressing plate 23 returns to its working position in which the plate 23 presses the film 14 against the aperture plate 22.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. A motion picture camera for use with double-eight film, comprising a housing including a rear portion defining a film chamber and a front portion; a lens unit mounted in said front portion; coupling means connecting said rear portion to said front portion, comprising an externally threaded male coupling element rigid with one of said portions and an internally threaded female coupling element rigid with the other of said portions and meshing with said male coupling element, said coupling elements being rotatable with reference to each other between two end positions about a common axis which is parallel with the optical axis of said lens unit, such rotation of said coupling elements resulting in slight movement of one of said portions with reference to the other portion in the direction of said common axis; film gate means mounted on said front portion; and film pressure plate means mounted on said rear portion to press a length of film between said film gate means and said pressure plate means against said gate means at least in said end positions of said coupling elements.

2. A motion picture camera for use with double-eight photographic film, comprising a housing including a rear portion defining a film chamber, and a front portion; a lens unit mounted in said front portion; coupling means connecting said rear portion to said front portion, said coupling means comprising a male coupling element provided with fine-pitch external threads and rigid with one of said portions and a female coupling element rigid with the other of said portions, said female coupling element being provided with fine-pitch internal threads and meshing with said male coupling element, said coupling elements being rotatable with reference to each other between two end positions about a common axis which is parallel to the optical axis of said lens unit; film gate means provided on one of said portions; and film pressure plate means mounted on one of said portions and cooperating with said gate means to press a length of a film against said gate means at least in said end positions of said coupling elements, said gate means and said pressure plate means being located within the confines of said coupling elements, at least in said end positions of said coupling elements.

3. A motion picture camera for use with double-eight photographic film, comprising a housing including a rear portion defining a film chamber and a front portion; a lens unit mounted in said front portion; an aperture plate mounted in said front portion behind said lens unit; coupling means connecting said rear portion with said front portion, comprising an externally threaded male coupling element rigit with one of said portions and an internally threaded female coupling element rigid with the other of said portions and meshing with said male coupling element, said coupling elements being rotatable with reference to each other about a common axis which is parallel with the optical axis of said lens unit and that coupling element which is rigid with said front portion surrounding said aperture plate, such rotation of said coupling elements resulting in slight movement of one of said portions with reference to the other portion in the direction of said comon axis; and pressure plate means mounted on one of said portions and cooperating with said plate to press a length of film against said plate at least in said end positions of said coupling elements.

4. A motion picture camera for use with double-eight film, comprising a housing including a rear portion defining a film chamber and having a front wall, and a front portion having a rear wall adjacent to said front wall; a lens unit mounted in said front portion; a coupling connecting said rear portion to said front portion and comprising a pair of coupling rings each rigid with one of said walls, one of said rings having internal threads and the other of said rings having external threads meshing with said internal threads and said rings being rotatable with reference to each other about a common axis which is parallel with the optical axis of said lens unit; a first plate mounted in that ring which is rigid with said rear wall and having an exposure aperture located behind said lens unit; a second plate mounted in that ring which is rigid with said front wall and having an opening located behind said exposure aperture; a source of film and a take-up device mounted in said film chamber; guide means for guiding the film from said source to said take-up device and arranged to guide a portion of the film in a path extending in said opening; and pressing means for pressing said portion of the film in said opening against said first plate.

5. A motion picture camera for use with double-eight film, comprising a housing including a rear portion defining a film chamber and having a front wall, and a front portion having a rear wall adjacent to said front wall; a lens unit mounted in said front portion; a coupling connecting said rear portion to said front portion and comprising a pair of coupling rings each rigid with one of said walls, one of said rings having internal threads and the other of said rings having external threads meshing with said internal threads and said rings being rotatable with reference to each other about a common axis which is parallel with the optical axis of said lens unit; a first plate mounted in that ring which is rigid with said rear wall and having an exposure aperture located behind said lens unit; a second plate mounted in that ring which is rigid with said front wall and having an opening located behind said exposure aperature; a source of film and a take-up device mounted in said film chamber; guide means for guiding the film from said source to said take-up device and arranged to guide a portion of the film in a path extending in said opening; and pressing means for pressing said portion of the film in said opening against said first plate, said pressing means comprising a plate-like member reciprocably mounted in said film chamber behind said portion of the film and movable into said opening, and resilient means for biasing said plate-like member into said opening so that said portion of the film is biased against said first plate.

6. A motion picture camera for use with double-eight film, comprising a housing including a rear portion defining a film chamber and having a front wall, and a front portion having a rear wall adjacent to said front wall; a lens unit mounted in said front portion; a coupling connecting said rear portion to said front portion and comprising a pair of coupling rings each rigid with one of said walls, one of said rings having internal threads and the other of said rings having external threads meshing with said internal threads and sealingly surrounded by said one ring, said rings being rotatable with reference to each other about a common axis which is parallel with the optical axis of said lens unit; a first plate mounted in that ring which is rigid with said rear wall and having an exposure aperture located behind said lens unit; a second plate mounted in that ring which is rigid with said front wall and having an opening located behind said exposure aperture; a source of film and a take-up device mounted in said film chamber; guide means for guiding the film from said source to said take-up device and arranged to guide a portion of the film in a path extending in said opening; and pressing means for pressing said portion of the film in said opening against said first plate.

7. A motion picture camera for use with double-eight film, comprising a housing including a rear portion having a front wall and defining a film chamber, and a front portion having a rear wall adjacent to said front wall; a lens unit mounted in said front portion forwardly of said rear wall; coupling means including an externally threaded male coupling element rigid with one of said walls and an internally threaded female coupling element rigid with the other of said walls and meshing with said male coupling element, said coupling elements being rotatable with reference to each other about a common axis which is parallel with the optical axis of said lens unit; means for arresting said rear portion in each of two end positions, said rear portion being movable from the one to the other of such end positions in response to rotation through an angle of 180 degrees, such rotation of said rear portion resulting in slight movement of said rear portion with reference to said front portion in the direction of said common axis; film gate means mounted on one of said portions within the confines of said coupling elements; and pressure plate means mounted on one of said portions and cooperating with said gate means to press a length of film against said gate means in each end position of said rear portion.

8. A motion picture camera for use with double-eight film, comprising a housing including a rear portion having a front wall and defining a film chamber, and a front portion having a rear wall adjacent to said front wall; a lens unit mounted in said front portion forwardly of said rear wall; coupling means including an externally threaded male coupling element rigid with one of said walls and an internally threaded female coupling element rigid with the other of said walls and meshing with said male coupling element, said coupling elements being rotatable with reference to each other about a common axis which is parallel with the optical axis of said lens unit; means for arresting said rear portion in each of two end positions, said rear portion being movable from one of said end positions to the other end position and back to said one end position in response to rotation through 180 degrees first in a clockwise direction and then in a counterclockwise direction, such rotation of said rear portion resulting in slight movement of said rear portion with reference to the front portion in the direction of said common axis; film gate means provided on said front portion; and film pressure plate means mounted on one of said portions and cooperating with said gate means to press a length of film against said gate means at least in said end positions of said rear portion.

9. A motion picture camera for use with double-eight film, comprising a housing including a rear portion having a front wall and defining a film chamber, and a front portion having a rear wall adjacent to said front wall; a lens unit mounted in said front portion forwardly of said rear wall; coupling means including an externally threaded male coupling element rigid with one of said walls and an internally threaded female coupling element rigid with the other of said walls and meshing with said male coupling elements, said coupling elements, being rotatable with reference to each other about a common axis which is parallel with the optical axis of said lens unit; and means for arresting said rear portion in each of two end positions, said arresting means comprising a projection extending from one of said walls toward the other wall and located at a predetermined distance from said common axis and a pair of abutments provided on said other wall and located at said predetermined distance from said common axis, said abutments being provided at such a distance from each other that, when said projection is moved from engagement with one of said abutments into engagement with the other abutment and back into engagement with said one abutment, said rear portion first rotates through 180 degrees in a clockwise direction and thereupon through the same angle but in a counterclockwise direction.

10. A camera as set forth in claim 9, further comprising detent means for releasably holding said rear portion in each of said end positions.

11. A camera as set forth in claim 10, wherein said detent means comprises a pair of springs provided on that wall which supports said abutments and each arranged to oppose movement of said projection away from one of said abutments.

12. A motion picture camera for use with double-eight film, comprising a housing including a rear portion having a front wall and defining a film chamber, and a front portion having a rear wall adjacent to said front wall; a lens unit mounted in said front portion forwardly of said rear wall; coupling means including an externally threaded male coupling element rigid with one of said walls and an internally threaded female coupling element rigid with the other of said walls and meshing with said male coupling element, said coupling elements being rotatable with reference to each other about a common axis which is parallel with the optical axis of said lens unit; manually operated locking means for locking said rear portion in each of two end positions, said rear portion being movable from the one to the other of said end positions in response to rotation through an angle 180 degrees, such rotation of said rear portion resulting in slight movement of said rear portion with reference to the front portion in the direction of said common axis; film gate means provided on said front portion; and film pressure plate means mounted on one of said portions and cooperating with said gate means to press a length of film against said gate means at least in said end positions of said rear portion.

13. A camera as set forth in claim 23, wherein said locking means comprises a bolt reciprocably mounted in one of said walls and having a portion movable into and out of one of a pair of recesses provided in the other of said walls, one of said recesses registering with said bolt in each end position of said rear portion.

14. A camera as set forth in claim 13, wherein said locking means further comprises means for reciprocating said bolt including a lever mounted on and accessible from the exterior of said front portion.

15. A motion picture camera for use with double-eight film, comprising a housing including a rear portion defining a film chamber and having a front wall, and a front portion having a rear wall adjacent to said front wall; a lens unit mounted in said front portion; a coupling connecting said rear portion to said front portion and comprising a pair of coupling rings each rigid with one of said walls, one of said rings having internal threads and the other of said rings having external threads meshing with said internal threads and said rings being rotatable with reference to each other about a common axis which is parallel with the optical axis of said lens unit; a first plate mounted in that ring which is rigid with said rear wall and having an exposure aperture located behind said lens unit; a second plate mounted in that ring which is rigid with said front wall and having an opening located behind said exposure aperture; a source of film and a take-up device mounted in said film chamber; guide means for guiding the film from said source to said take-up device an arranged to guide a portion of the film in a path extending in said opening; pressing means for pressing said portion of the film in said opening against said first plate; manually operated locking means for locking said rear portion in either of two end positions, said rear portion being movable from the one to the other of such end positions and back to said one end position in response to rotation through an angle of 180 degrees first in a clockwise direction and thereupon in a counterclockwise direction; and means for moving said pressing means away from said first plate in response to unlocking of said second portion.

16. A motion picture camera as set forth in claim 15, wherein said locking means comprises a bolt reciprocably mounted in one of said portions in parallelism with said optical axis and movable into and out of recess provided in the other of said portions, one of such recesses registering with said bolt in each end position of said second portion.

17. A motion picture camera as set forth in claim 16, further comprising manually operated means for reciprocating said bolt and an operative connection between said manually operated means and said pressing means for moving the pressing means away from said first plate when the bolt is withdrawn from one of said recesses to permit rotation of said rear portion.

References Cited

UNITED STATES PATENTS 2,066,563    1/1937    Fuerst _____ 95—31
3,166,756    1/1965    Hampl _____ 352—83

FOREIGN PATENTS 1,043,076    11/1958    Germany.

JULIA E. COINER, *Primary Examiner.*